US008756490B2

(12) United States Patent
Horiuchi et al.

(10) Patent No.: US 8,756,490 B2
(45) Date of Patent: *Jun. 17, 2014

(54) EDITING PARENT AND CHILD WEB PAGES

(75) Inventors: Yoshio Horiuchi, Hiratsuka (JP);
Masabumi Koinuma, Cary, NC (US);
Kohji Nakamori, Yamato (JP); **Mari
(Kuroki) Onishi**, Sagamihara (JP);
Masaki Saitoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 2172 days.

This patent is subject to a terminal disclaimer.

(21) Appl. No.: 11/293,478

(22) Filed: Dec. 2, 2005

(65) Prior Publication Data
US 2006/0123330 A1 Jun. 8, 2006

(30) Foreign Application Priority Data

Dec. 2, 2004 (JP) ................................ 2004-350470

(51) Int. Cl.
*G06F 17/00* (2006.01)

(52) U.S. Cl.
USPC ............ 715/234; 715/255; 715/271; 715/277

(58) Field of Classification Search
USPC ............ 71/234, 240, 255, 271, 277; 715/234, 715/240, 255, 271, 277
See application file for complete search history.

(56) References Cited

U.S. PATENT DOCUMENTS

| | | | |
|---|---|---|---|
| 6,177,936 B1 * | 1/2001 | Cragun | 715/760 |
| 6,548,480 B1 | 4/2003 | Norcini et al. | |
| 7,080,083 B2 * | 7/2006 | Kim et al. | 707/100 |
| 7,392,510 B1 * | 6/2008 | Treder et al. | 717/128 |
| 2003/0120686 A1 | 6/2003 | Kim et al. | |
| 2010/0058172 A1 | 3/2010 | Soldan et al. | |

FOREIGN PATENT DOCUMENTS

JP 07056786 3/1995

OTHER PUBLICATIONS

K. Suzuki, et al.; "InterServe 3/Business Object SGML Repository," BNN Co. Oracle LIFE, vol. 1, No. 7, pp. 134-141, Dec. 13, 1996.
David Flanagan, "JavaScript, The Definitive Guide", fourth edition, Jan. 2002, ISBN 0-596-00048-0, pp. 1-5.

* cited by examiner

*Primary Examiner* — Adam M Queler
(74) *Attorney, Agent, or Firm* — Brevetto Law Group

(57) ABSTRACT

The present invention provides a Web page edit screen that allows an author to edit parent and child documents collectively while showing, in an appropriate manner, the content of the child document embedded in the parent document. Associated documents of a Web page to be edited are managed as managed documents individually. Document-by-document structure information is derived from the content of each managed document. Web page structure information is then assembled by connecting the document-by-document structure information based on embed-related code. Edit screen data is generated based on the content of the managed documents and the Web page structure information to generate a browser-type edit screen. The content of a relevant managed document is synchronized with the edited content on the edit screen. The edit screen data is matched with the edited content on the edit screen.

19 Claims, 12 Drawing Sheets

401

```
<HEAD>
<LINK href="mystyle.css" rel="stylesheet"
      type="text/css" />
<TITLE>sample1.jsp</TITLE>
</HEAD>
<BODY><H1>Web development environment</H1>
```

```
<LINK href="mystyle.css" rel="stylesheet"
      type="text/css" />
```

404

```
<HEAD>
<%@taglib uri="vct_test_offrendering"
   prefix="off"%>
<%@ include file="fragment2.jsp" %>
<TITLE>sample1.jsp</TITLE>
</HEAD>
<BODY><H1>Web development environment</H1>
```

FIG. 9B

EDITING PARENT AND CHILD WEB PAGES

FIELD OF THE INVENTION

The present invention relates to a Web page authoring apparatus, method, and program for editing a Web page, and more particularly to a Web page authoring apparatus, method, and program using an improved screen for editing a Web page.

BACKGROUND ART

Page Designer and Dreamweaver®, which are well-known as Web page authoring tools, provide an edit screen on which an HTML document can be displayed like a Web client's browser screen (hereinafter referred to as "browser-like edit screen"), as well as an edit screen for directly editing source code of the HTML document, so that an editor or author can edit the HTML document efficiently on the browser-like edit screen.

On the other hand, JSP (JavaServer Pages™) documents are stored in the memory of a Web server to generate HTML documents as Web pages. The author can use a code such as <jsp:include> or <jsp:directive.include> in a JSP document to embed any other document in the JSP document.

For convenience of explanation, among documents constituting or creating a Web page, a document in which any other document is to be embedded is called a "parent document", while the other document to be embedded is called a "child document".

FIG. 12 shows a display state of a parent document 602 on a browser-like edit screen 601 of a conventional Web page authoring tool 600. A child document is merely indicated as an icon 603, without its specific content, at a position where it is inserted in the parent document 602.

FIG. 13 shows a frame editing screen 610 of a browser type according to the conventional Web page authoring tool 600. The parent document includes an instruction for dividing the browser screen into two flames such as right and left frames and identification of child documents 611, 612 to be embedded in the right and left frames, respectively. Thus, the author can edit two or more child documents embedded in the respective frames of the parent document on the frame editing screen 610 that displays the child documents in a manner similar to an actual browser.

FIG. 14 shows an edit screen 630 of Microsoft® Word. Suppose that a parent document 631 is a Microsoft® Word document while a child document 632 is a document edited in a different application other than Microsoft® Word. In this case, if the author double-clicks on the display area of the child document 632 embedded in the parent document 631, the different application will be started so that the author can edit the child document 632 in the different application. The display area of the child document 632 is limited within a rectangular box 633, that is, the child document can never be displayed in a non-rectangular box. On the other hand, if the child document 632 is also a Microsoft® Word document and is embedded in the parent document 631, the content of the child document 632 turns into the content of the parent document 631. Therefore, even if the embedded text is edited in the parent document 631, the edited content is not reflected in the child document 632.

Japanese Published Patent Application 07-56786 teaches a structured document processor, in which an integrated document is divided into a plurality of document components (e.g., Chapter 1 document component, Chapter 2 document component, . . . ) so that two or more authors can edit each document component while maintaining data consistency with a document component being used as a unit of saving and loading. The structured document processor constructs a tree structure of the integrated document and the document components, controls connections or links between the document components based on the hierarchy of the document components, and manages the logical order (page order) of the document components in the integrated document (see FIGS. 4 and 5 of Japanese Published Patent Application 07-56786).

The browser-like edit screen 601 of the Web page authoring tool 600 shown in FIG. 12 displays only the icon 603 at the embedding position of the child document. Therefore, once the child document is embedded at a specified position in the parent document 602, the author cannot edit these documents on the browser-like edit screen 601 while viewing the display states of the parent document 602 and the child document on the browser screen.

On the other hand, the Web page authoring tool 600 shown in FIG. 13 allows the author to edit, on the frame editing screen 610, the child documents 611 and 612 embedded in the parent document while viewing the display states of the child documents embedded in the parent document, that is, while viewing them on the browser-like edit screen. In this case, however, a form for embedding the child documents 611 and 612 in the parent document is limited to a rectangle. In the Web page frames, the child documents LEFT.html and RIGHT.html are embedded in the parent document using, for example, the following code statement: <FRAMESET COLS="50%, 50%">, <FRAME SRC="LEFT.html"> and <FRAME SRC="RIGHT.html">. Thus, neither can the text and images of the parent document itself be displayed, nor the beginning of each child document be located before or behind any character or image in the parent document. Also, <BODY> (tag name) indicating the body of the parent document is not displayed on the frame editing screen 610. The embed-related code for embedding the child document at any structure position in the parent document may be <jsp:include> or <jsp:directive.include>.

Since a form for embedding the child document 632 in the parent 631 on the edit screen 630 of the word processor shown in FIG. 14 is also limited to a rectangle, like the frame editing screen 610 in FIG. 13, it is difficult to set the beginning of the child document 632 at any position in the parent document 631 and hence to display the set position on the edit screen 630. In addition, if the child document 632 is a Microsoft® Word document like the parent document 631 and is edited on the edit screen 631 after embedding the child document 632 in the parent document 631, the edited content is reflected only in the parent document 631, rather than in the child document 632. Therefore, if the child document 632 is to be embedded also in another parent document or at another position in the parent document 631, the child document 632 portion in another parent document or another position in the parent document 631 would have to be reedited separately.

Page Designer and Dreamweaver®, well-known as Web page authoring tools, have a preview screen showing how the web page being edited on the edit screen is displayed on an actual browser screen, and the author can open a browser from the preview screen to check how the document being edited is actually displayed by the browser. However, the author cannot edit the document on the preview screen showing the browser screen image.

SUMMARY OF THE INVENTION

It is an object of the present invention to provide a Web page authoring apparatus, Web page authoring method, and program, which allow an author to edit parent and child documents without difficulty on an edit screen where a form for embedding a child document in a parent document is not limited to a rectangle, an actual state of embedding the child document in the parent document is displayed at it is, the content of tags is converted into visual representation without displaying the tags.

A Web page authoring apparatus according to the present invention comprises:

document-by-document management means for individually managing the content of documents forming the respective portions of a Web page to be edited, as managed documents;

document-by-document structure information deriving means for deriving, from the content of each managed document, structure information of each managed document including an embed-related code for embedding another document at a predetermined embedding position, as document-by-document structure information;

Web page structure information assembling means for assembling, as Web page structure information, structure information of the Web page to be edited by combining the document-by-document structure information based on the embed-related code in each document-by-document structure information;

edit screen data generating means for generating edit screen data to create an edit screen on which the tag content of a document to be edited are converted to visual representation, based on the content of the managed documents and the Web page structure information;

edit screen generating means for generating an edit screen based on the edit screen data;

relevant managed document detecting means for detecting, as a relevant managed document, a managed document including a portion corresponding to an edited portion on the edit screen; and synchronization means for synchronizing the content of the relevant managed document with the edited content on the edit screen based on edit operations on the edit screen, wherein the edit screen data generating means matches the edit screen data with the edited content on the edit screen based on the edit operations on the edit screen.

A Web page authoring method according to the present invention comprises:

a document-by-document management step of individually managing the content of documents forming the respective portions of a Web page to be edited, as managed documents;

a document-by-document structure information deriving step of deriving, from the content of each managed document, structure information of each managed document including an embed-related code for embedding another document at a predetermined embedding position, as document-by-document structure information;

a Web page structure information assembling step of assembling, as Web page structure information, structure information of the Web page to be edited by combining the document-by-document structure information based on the embed-related code in each document-by-document structure information;

an edit screen data generating step of generating edit screen data to create an edit screen on which the tag content of a document to be edited are converted to visual representation, based on the content of the managed documents and the Web page structure information;

an edit screen generating step of generating an edit screen based on the edit screen data;

a relevant managed document detecting step of detecting, as a relevant managed document, a managed document including a portion corresponding to an edited portion on the edit screen; and a synchronization step of synchronizing the content of the relevant managed document with the edited content on the edit screen based on edit operations on the edit screen, wherein the edit screen data generating step matches the edit screen data with the edited content on the edit screen based on the edit operations on the edit screen.

In one aspect, a program according to the present invention causes a computer to function as the respective means of the above-mentioned Web page authoring apparatus. In another aspect, a program according to the present invention causes a computer to execute the respective steps of the above-mentioned Web page authoring method. A program product according to the present invention comprises a computer-readable recording medium, and the above-mentioned program recorded on the recording medium.

The present invention uses an edit screen showing a document to be edited by converting tag content of the document to be edited into visual representation. Managed documents constituting a Web page to be edited are managed individually for their content, rather than managed collectively, that is, as the Web page to be edited which is constituted by integrating the managed documents, and edit screen data for generating an edit screen is generated based on Web page structure information connecting document-by-document structure information of each managed document according to embed-related code. Therefore, edit screen data is created to include information indicating that the beginning structural part of a child document is embedded at a position specified by the embed-related code in a parent document, so that an edit screen can be generated with a form for embedding the child document not limited to a rectangle, and the edited content on the edit screen can be appropriately reflected as that of the related parent and child documents.

BRIEF DESCRIPTION OF THE DRAWINGS

FIG. 9 shows an example of a CSS specification in a Web page document.

BEST MODE FOR CARRYING OUT THE INVENTION

Figure 1:
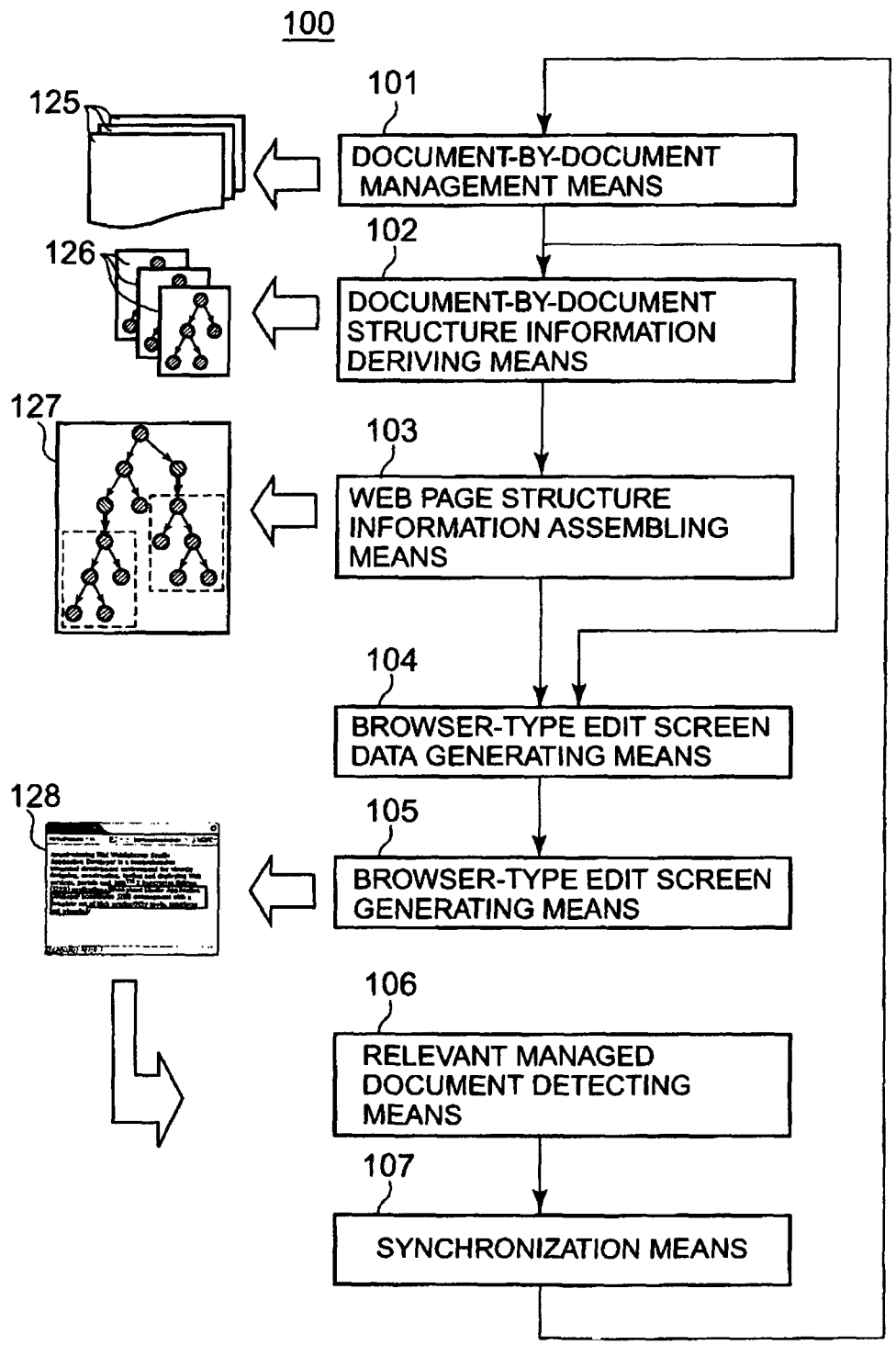
FIG. 1 is a functional block diagram of a Web page authoring apparatus according to the present invention.

FIG. 1 is a functional block diagram of a Web page authoring apparatus 100. The Web page authoring apparatus 100 includes document-by-document management means 101, document-by-document structure information deriving means 102, Web page structure information assembling means 103, browser-type edit screen data generating means 104, browser-type edit screen generating means 105, relevant managed document detecting means 106, and synchronization means 107. Here, each of documents constituting or creating a Web page is called an associated document of the Web page. The document-by-document management means 101 manages the content of associated documents of the Web page to be edited individually as managed documents 125. A document to be edited specifies another document to be edited based on embed-related code contained in the document to embed that another document to be edited at a predetermined embedding position. The Web page to be edited is made up entirely of two or more managed documents 125 combined according to the embed-related code. The document structure information deriving means 102 derives, as document-by-document structure information 126, structure information of each managed document 125 from the content of each managed document 125. The Web page structure information assembling means 103 assembles, as Web page structure information 127, structure information of a Web page to be edited by combining document-by-document structure information 126 based on the embed-related code in each document-by-document structure information 126.

Here, an edit screen that converts the tag content of documents to be edited into visual representation without showing the tags and hence makes it easy to edit the documents to be edited on the edit screen is called a browser-type edit screen. Although typical documents to be edited are described in a markup language such as HTML or XML, the tags for the markup language, (e.g., <...>) are not directly displayed on the browser-type edit screen. The browser-type edit screen data generating means 104 generates browser-type edit screen data for generating a browser-type edit screen 128 based on the content of the managed documents 125 and the Web page structure information 127. The browser-type edit screen generating means 105 generates the browser-type edit screen 128 based on the browser-type edit screen data. The relevant managed document detecting means 106 detects a document including a portion corresponding to an editing portion on the browser-type edit screen 128 as a relevant managed document 125. The synchronization means 107 synchronizes the content of the relevant managed document 125 with the edited content on the browser-type edit screen 128 based on the editing operations on the browser-type edit screen 128. The browser-type edit screen data generating means 104 matches the browser-type edit screen data with the edited content on the browser-type edit screen 128 based on the editing operations on the browser-type edit screen 128.

Figure 3:
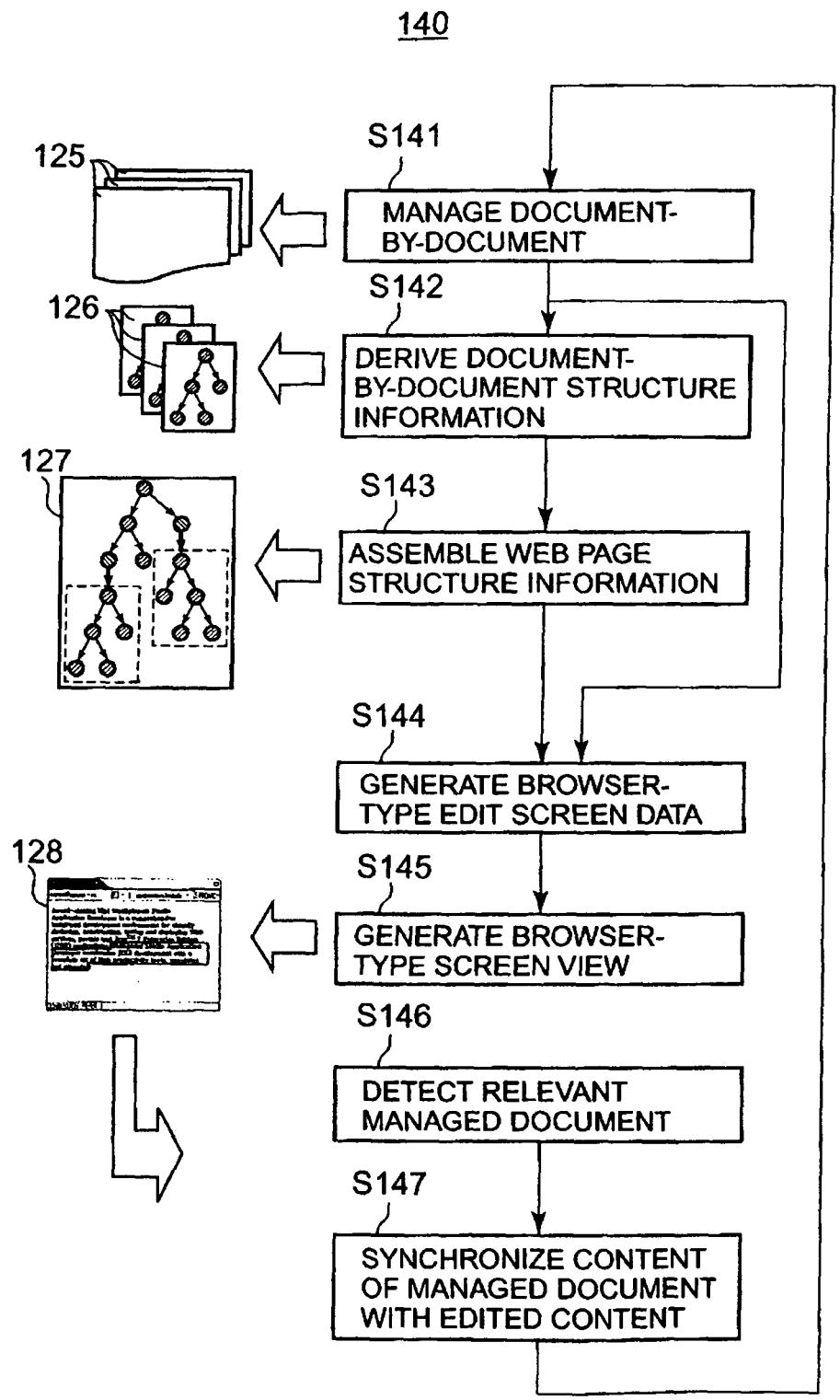
FIG. 3 is a flowchart of a Web page authoring method according to the present invention.

FIG. 3 is a flowchart of a Web page authoring method 140. In document-by-document management step S141, documents associated with a Web page to be edited are managed as managed documents 125 individually. In document-by-document structure information deriving step S142, structure information of each managed document 125 is derived as document-by-document structure information 126 from the content of the managed document 125. In Web page structure information assembling step S143, structure information of a Web page to be edited is assembled as Web page structure information by combining document-by-document structure information 126 based on embed-related code in each document-by-document structure information 126. In browser-type edit screen data generating step S144, browser-type edit screen data for generating a browser-type edit screen 128 is generated based on the content of the managed documents 125 and the Web page structure information. In browser-type edit screen generating step S145, the browser-type edit screen 128 is generated based on the browser-type edit screen data. In step S146 for detecting a relevant managed document 125, a managed document including a portion corresponding to an editing portion on the browser-type edit screen 128 is detected as a relevant managed document 125. In synchronizing step S147, the content of the relevant managed document 125 is synchronized with the edited content on the browser-type edit screen 128 based on the editing operations on the browser-type edit screen 128. Then, in browser-type edit screen data creating step S144, the browser-type edit screen data is matched with the edited content on the browser-type edit screen 128 based on the editing operations on the browser-type edit screen 128.

Since the Web page authoring apparatus 100 of FIG. 1 and the Web page authoring method 140 of FIG. 3 have the same technical effect, except that one is implemented as an apparatus invention and the other a method invention, that is, they are different only in invention category, the following collectively describes both.

For example, a Web page is a structured document, while each associated document of the Web page is either a structured document or a document for generating a structured document. To be more specific, a Web page to be edited is, for example, an HTML document, while a managed document 125 is, for example, a JSP, HTML, or XML document. Assuming that there are two documents in an embedding relationship in which embed-related code is in one document to embed the other document, the one is called a parent document and the other is called a child document. Unlike those supporting the editing of only the parent document, the Web page authoring apparatus 100 supports the editing of both the parent document and the child document.

In typical Web systems, Web pages are HTML documents. When a Web page consists of two or more documents to be edited, which are associated documents of the Web page, a parent document at the top level among these documents to be edited is, for example, a JSP document. The child document is a JSP, HTML, or XML document. In JSP documents, Java™ code is embedded in HTML in an appropriate manner. Therefore, if the child document is a JSP document, other documents can be embedded in the child document using embed-related code. Thus, any two managed documents extracted from documents associated with a common Web page to be edited may be in a direct parent-child relationship, or in such a relationship that they are located at both ends of a chain of parent-child relationships (that is, in a relationship between ancestor and descendant more than two generations apart).

There are the following cases: (a) a child document may be embedded in two or more places in a parent document; or (b) since the Web page authoring apparatus 100 and the Web page authoring method 140 enable the editing of two or more Web pages by switching over among them, a document as a child document may be embedded in parent documents for different Web pages. In the Web page authoring apparatus 100 and the Web page authoring method 140, the document-by-document management means 101 manages a child document in an integrated fashion as one managed document 125. Therefore, if the child document in the case (a) is edited in one of the embedding places in one parent document, the same editing operation in the other places can be omitted. On the other hand, if the child document in the case (b) is edited on the browser-type edit screen 128 related to one parent document, the editing of the child document in the other parent documents can be omitted.

Figure 5:
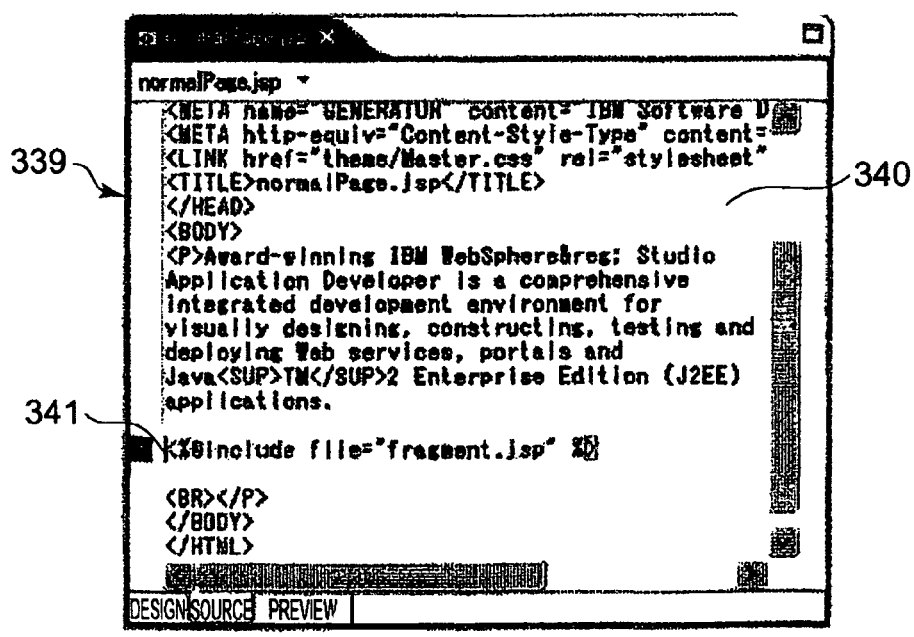
FIG. 5 shows a display state of parent and child documents on a source screen of a Web page authoring tool.
Figure 6:
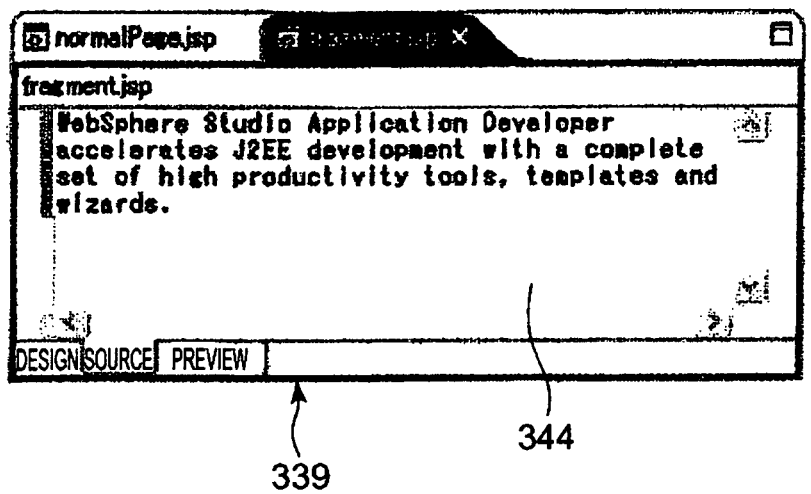
FIG. 6 shows a display state of a child document on the source screen of the Web page authoring tool.

FIGS. 5 and 6 show the display states of a parent document 340 and a child document 344 on a source screen 339 of a Web page authoring tool 338, respectively. The Web page authoring tool 338 is an example of the Web page authoring apparatus 100. The parent document 340 and the child document 344 are examples of predetermined documents associated with Web page to be edited. The Web page authoring tool 338 can display the documents to be edited on the source screen 339, a design screen 347 (FIG. 7), and a preview screen. The design screen 347 is an example of the browser-type edit screen 128.

The source screen 339 displays source code of a document to be edited, showing the parent document 340 with not only its tag content but also a tag indicating that the child document 344 is embedded. Both the parent document 340 and the child document 344 are JSP documents, and the name of the parent document 340 is normalPage.jsp. The name of the child document 344 is fragment.jsp as apparent from the following embed-related code 341: <%@include file="fragment.jsp"%>. In this specification, a document may be any file excluding executable ones. Although the embed-related code 341 states that the child document 344 is embedded at a node position indicated by the embed-related code 341, it should be noted that the present invention is applicable to such a case that the embed-related code may be rewritten in future to specify a different node other than the embedding node position.

The Web page authoring tool 338 starts a browser on the preview screen so that the browser will render the actual state of the document to be edited. The preview screen of the Web page authoring tool 338 is the same as that of the browser. An individual document is displayed on the source screen 339, while a Web page to be edited generated by combining documents based on the embed-related code is displayed on the design and preview screens.

The source screen 339 in FIG. 5 shows only the final paragraph of the parent document 340 due to limitations of screen space without showing the beginning part of the parent document 340 on the source screen 339. The author can drag the scroll box to any position in the scroll bar on the right hand to edit any part of the parent document 340. The embed-related code 341 is placed in BODY section between start tag <body> and end tag </body> in the parent document 340.

Figure 7:
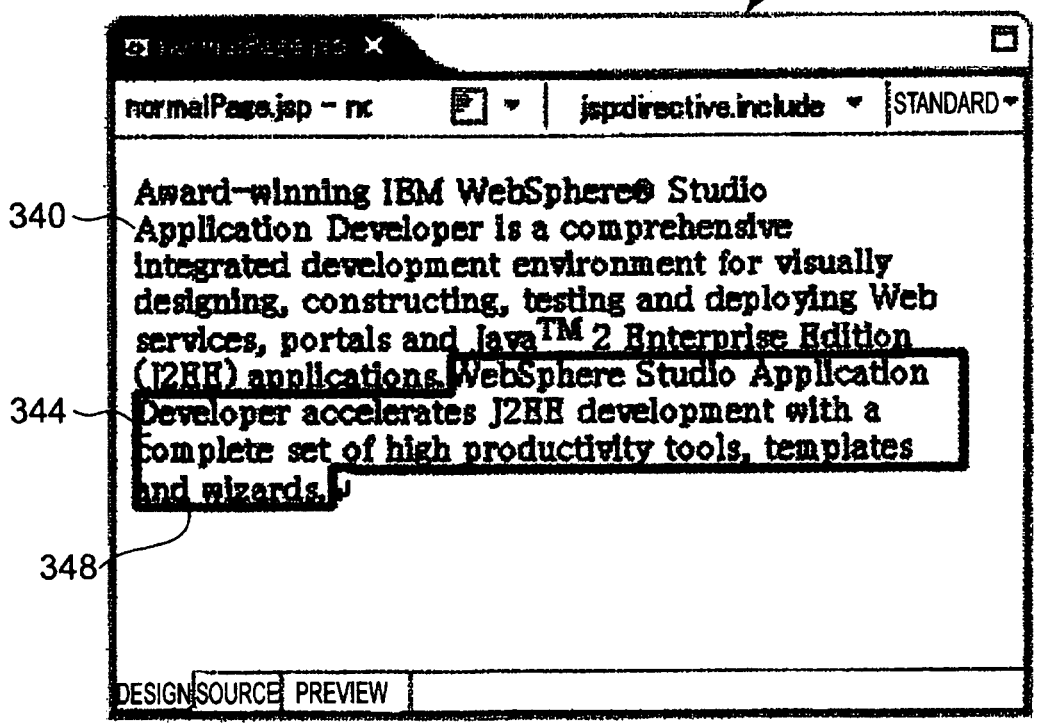
FIG. 7 shows a display state of a parent document on a design screen of the Web page authoring tool.

FIG. 7 shows the display state of the parent document 340 on the design screen 347 of the Web page authoring tool 338. The design screen 347 is an example of the browser-type edit screen 128 (FIGS. 1 and 3). An embedding box 348 is just added to FIG. 7 to clearly illustrate the position of embedding the child document 344 on the design screen 347, but it does not appear on an actual design screen 347. However, the embedding box 348 may be actually displayed with a predetermined operation to let the author know where the child document 344 is located at the time of editing. The Web page authoring tool 338 shows a Web page to be edited as if it looks visually the same in both the design screen 347 and the preview screen. A different point is that when clicking on a link-embedded text or image on the preview screen, view is switched to a linked Web page, whereas such a thing never happens on the design screen 347. The author can directly edit the source code of the parent document 340 and the child document 344 on the source screen 339 (FIGS. 5 and 6) while the author can edit the parent document 340 and the child document 344 on the design screen 347 in the same display state as that of the browser screen for the documents to be edited in which the parent document 340 and the child document 344 are associated documents, even if the author is not familiar with specific HTML tags or JSP commands.

Figure 8:
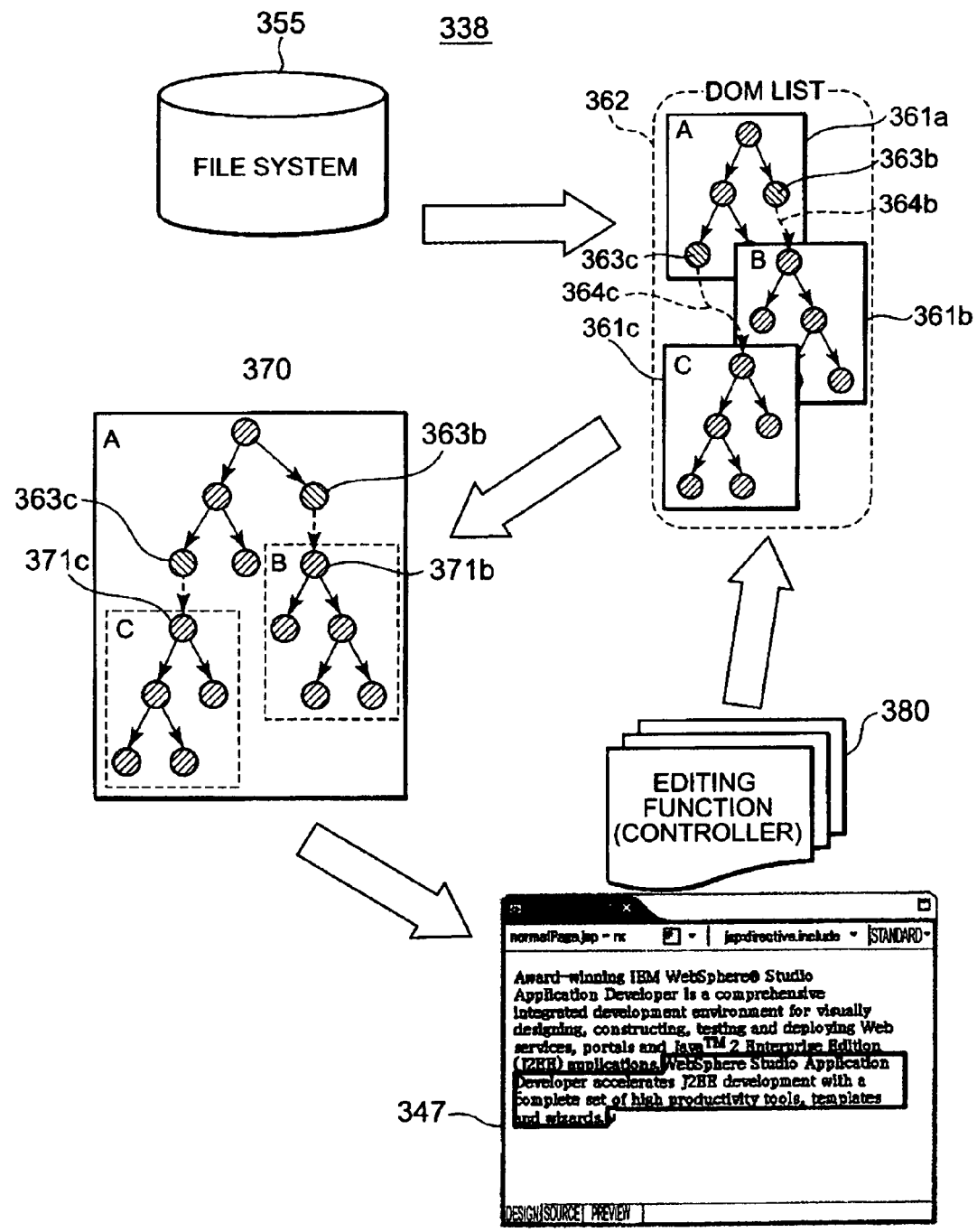
FIG. 8 is an illustration for explaining processing functions of the Web page authoring tool.

FIG. 8 is an illustration for explaining processing functions of the Web page authoring tool 338. It is assumed in FIG. 8 that the Web page to be edited is represented as Web page W (though W is not shown, W is used to indicate a specific Web page for convenience of explanation), and documents A, B, and C are documents associated with the Web page W. It is further assumed that the document A is a parent document, and the documents B and C are child documents embedded in different places in the document A. Here, suppose that the documents A, B, and C are already stored in a file system 355. In other words, this editing session is to reedit the Web page W. The file system 355 is an example of an auxiliary memory 116, typified by a local drive of a personal computer on which the Web page authoring tool 338 is installed. When the author specifies the document A or the Web page W, the Web page authoring tool 338 loads the document A from the file system 355. The Web page authoring tool 338 searches the loaded document A for embed-related code, and if any embed-related code is found, the documents B and C are loaded from the file system 355 as documents to be embedded in the document A. If either or both of the documents B and C further have child documents, they will be processed in the same manner as the document A. Searching the document A for embed-related code may be done in connection with the creation of DOM information 361a on the document A.

The Web page authoring tool 338 creates DOM (Document Object Model) information 361a, 361b and 361c on each document loaded, and manages such DOM information in a DOM list 362. The DOM itself is well-known XML structure information. The DOM list 362 also manages embed-related nodes 363b and 363c associated with the embed-related code in the parent document and link information 364b and 364c to the child documents embedded in the parent document by the embed-related code. The management of the content of each of the documents A, B, and C in the DOM list 362 corresponds to the management of managed documents by the document-by-document management means 101 of the Web page authoring apparatus 100 and in step S141 of the Web page authoring method 140. The derivation of the DOM information 361a, 361b, and 361c corresponds to the derivation of the document-by-document structure information 126 by the document structure information deriving means 102 of the Web page authoring apparatus 100, and in step S142 of the Web page authoring method 140. The embed-related nodes 363b and 363c, and the link information 364b and 364c are examples of information as the basis of processing for assembling the Web page structure information 127 by the Web page structure information assembling means 103 of the Web page authoring apparatus 100 and in step S143 of the Web page authoring method 140.

A view object tree 370 corresponds to the DOM information of the entire Web page W, and is created based on the DOM information 361a, 361b and 361c, the embed-related nodes 363, and the link information 364. In the view object tree 370, the embed-related nodes 363b and 363c of the document A as the parent document are managed integrally with the root nodes 371b and 371c of the documents B and C as the child documents linked to the parent document, respectively. The view object tree 370 is an example of the Web page structure information 127.

Since each node in the view object tree 370 also contains the content of the document A, B, or C, the edit screen data from which the design screen 347 is generated is generated based on the view object tree 370. The design screen 347 is generated based on the edit screen data. The design screen 347 in FIG. 8 has the same content as the design screen 347 in FIG. 7. However, an actual display of the design screen 347 of FIG. 8 shows view objects, such as text and images, defined in each of the documents A, B, and C to be displayed on the Web page, in virtually the same visual representation as on a browser screen, that is, in a visual representation mode of the browser-type edit screen.

The author edits the Web page W on the design screen 347. The editing on the design screen 347 includes the editing of text and style (layout, font, font size, etc), and editing related to embedding of other documents. The edited content may also include images as well as text. The Web page authoring tool 338 having sufficient editing functions allows the author to edit image content itself on the design screen 347 as well as to do some simple editing of an image such as to insert or delete the image. In addition, the author can do editing work on the design screen 347 without consideration about to which of the documents A, B, and C the portion being edited belongs.

An editing function part 380 monitors the editing done by the author on the design screen 347. Processing in the editing function part 380 corresponds to specific procedures in the managed document detecting means 106 and the synchronization means 107 of the Web page authoring apparatus 100, and in steps S146 and S147 of the Web page authoring method 140. Based on the monitoring results, the editing function part 380 detects which of the documents A, B, and C includes the portion corresponding to the portion edited on the design screen 347. Then, once the content is updated on the design screen 347, the updated content is reflected in the content of the corresponding document A, B, or C. When editing corresponding to the addition or deletion of a node is done on the design screen 347, the addition or deletion of the node is performed on the DOM information 361a, 361b, or 361c. When an embedding position is changed on the design screen 347, a corresponding embed-related node 363b or 363c, and corresponding link information 364b or 364c, etc. in the DOM list 362 are changed in synchronization with the change on the design screen 347. When editing corresponding to the embedding of a new child document or deletion of an existing child document is done on the design screen 347, the addition of new DOM information to the DOM list 362 or the deletion of corresponding link information from the DOM list 362 is performed in synchronization with the editing operation on the design screen 347.

The view object tree 370 is updated as the DOM information 361a, 361b, or 361c is updated in the DOM list 362. Thus the consistency between the content of the design screen 347 and that of the view object tree 370 is maintained. To be more specific, this matching process includes the following steps. In the first step (a), the author does editing work on the design screen 347. In step (a), the edited content is not reflected on the design screen 347 yet. In the next step (b), corresponding DOM information 361a, 361b, or 361c is updated. As a result, a difference occurs between the content of the DOM information 361a, 361b, or 361c and the content of the design screen 347. In step (c), the view object tree 370 is updated based on the updated content of the DOM information 361a, 361b, or 361c. Steps (a) to (c) are completed instantaneously, so that the author will feel like the design screen 347 is reflecting the content the author has just input or edited.

As stated above, when the plural documents A, B, and C in a parent-child relationship are associated documents for one Web page W, the Web page authoring tool 338 generates a design screen 347 in virtually the same representation mode as that of a browser showing the Web page W, so that the author can edit the documents A, B, and C collectively on the design screen 347.

Returning to FIGS. 1 and 3, additional functions and additional processing of the Web page authoring apparatus 100 and the Web page authoring method 140 will be described below.

In order to match the browser-type edit screen data with the content edited on the browser-type edit screen, the browser-type edit screen data generating means 104 of the Web page authoring apparatus 100 synchronizes the content of the managed document 125 with that of the Web page structure information 127 to update the browser-type edit screen data. Similarly, in order to match the browser-type edit screen data with the content edited on the browser-type edit screen, the browser-type edit screen data is updated in step S144 of the Web page authoring method 140 based on the synchronization between the content of the managed document 125 and that of the Web page structure information 127.

The following describes a typical example of the process to reflect the edited content on the browser-type edit screen:

(a) The content of editing done by the author on the browser-type edit screen 128 is reflected on the content of a relevant managed document 125. At this moment, the browser-type edit screen 128 is not changed yet.

(b) The Web page structure information 127 is updated based on the updated content of the managed document 125.

(c) The browser-type edit screen data is updated to update the browser-type edit screen 128.

Figure 2:
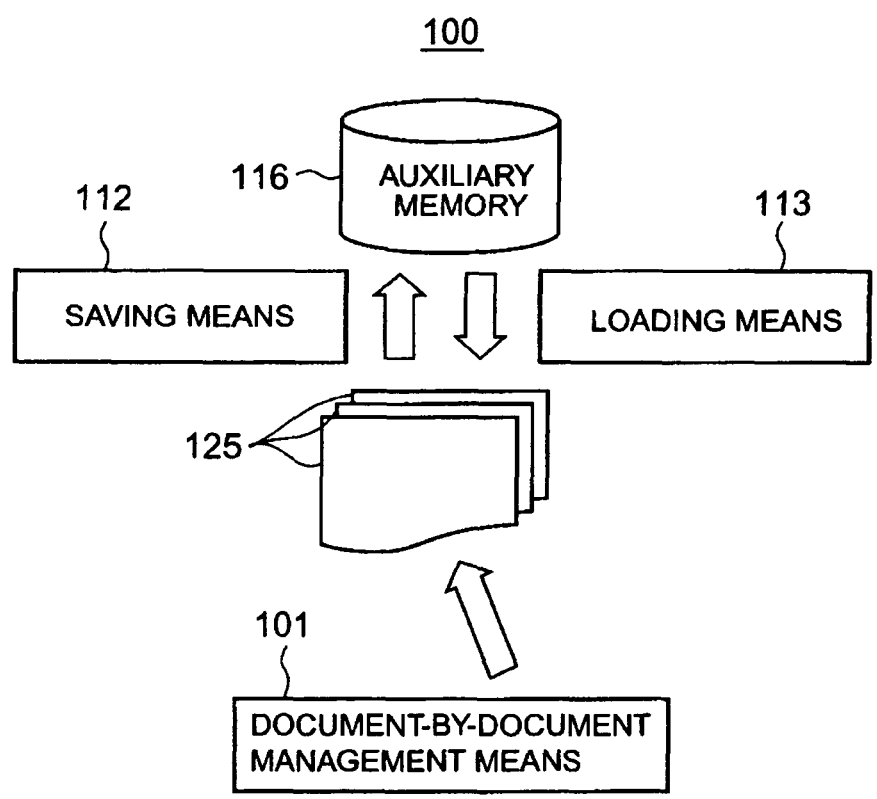
FIG. 2 is a functional block diagram of the main part of the Web page authoring apparatus with additional functions.
Figure 4:
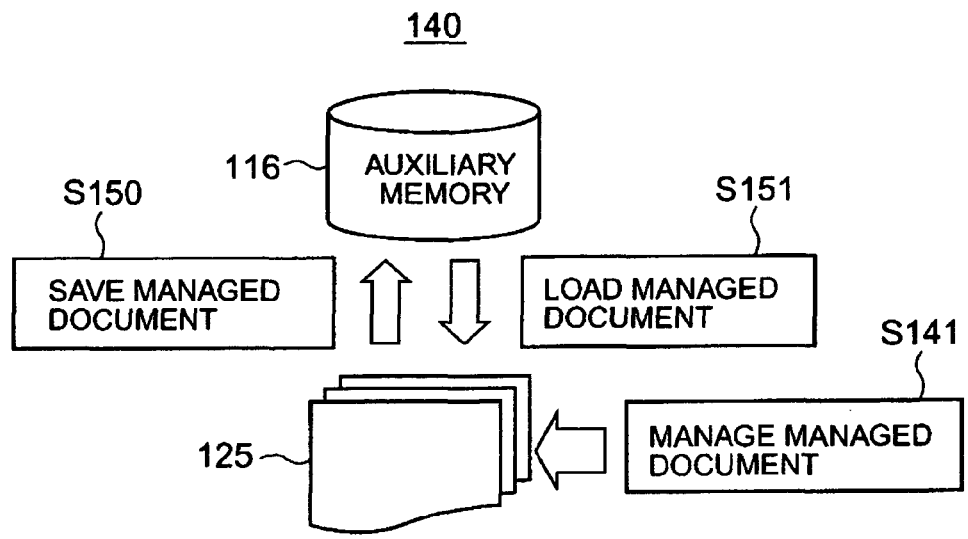
FIG. 4 is a flowchart of the main part of the Web page authoring method with additional processing steps.

FIG. 2 is a functional block diagram of the main part of the Web page authoring apparatus 100, showing additional functions. FIG. 4 is a flowchart of the main part of the Web page authoring method 140, showing additional processing steps. When saving a Web page to be edited into an auxiliary memory 116, saving means 112 of the Web page authoring apparatus 100 saves at least a managed document 125 associated with the Web page to be edited, the content of which is updated (typically all the managed documents 125). When loading a Web page to be edited from the auxiliary memory 116 prior to start of editing, loading means 113 loads all the associated documents of the Web page to be edited. The document-by-document management means 101 manages the content of the loaded associated documents individually as managed documents 125. Similarly, when a Web page to be edited is saved into the auxiliary memory 116, at least a managed document 125 associated with the Web page to be edited, the content of which is updated (typically all the managed documents 125) is saved in saving step S150 of the Web page authoring method 140. On the other hand, when a Web page to be edited is loaded from the auxiliary memory 116 prior to start of editing, all the documents associated with the Web page to be edited are loaded in loading step S151. Then, in step S141, the content of the loaded associated documents are managed individually as managed documents 125. As stated above, the Web page associated documents edited on the browser-type edit screen 128 are saved in the auxiliary memory 116, and upon reediting, they are loaded from the auxiliary memory 116 into the Web page authoring apparatus 100. The saving and loading operations are thus performed without difficulty.

Here, a hierarchical relation between documents is so defined that the level of a document to embed another document is at one level higher than that of another document.

Among the managed documents 125 associated with the Web page to be edited, the one at the top of the hierarchy is called a top-level managed document 125. The loading means 113 of the Web page authoring apparatus 100 first loads the top-level managed document 125 among the associated managed documents 125 of the Web page to be reedited. Then, when the loaded managed document 125 is to embed a managed document 125 lower than the loaded managed document 125 by one level, the loading means 113 loads the lower managed document 125 from the auxiliary memory 116. Similarly, in step S151 of the Web page authoring method 140, the top-level managed document 125 is first loaded among the associated managed documents 125 of the Web page to be reedited. Then, when the loaded managed document 125 is to embed a managed document 125 lower than the loaded managed document 125 by one level, the lower managed document 125 is loaded in step S151 from the auxiliary memory 116. As stated above, when a Web page to be edited already stored in the auxiliary memory 116 is to be reedited, associated documents can be loaded from the auxiliary memory 116 without difficulty.

In FIG. 1, when such an edit operation as to add a new document to be edited is performed on the browser-type edit screen 128, the synchronization means 107 synchronizes the addition of a managed document 125 corresponding to the document to be edited with the document addition on the browser-type edit screen 128, thus adding the managed document 125. Similarly, in FIG. 3, when such an edit operation as to add a new document to be edited is performed on the browser-type edit screen 128, the addition of a managed document 125 corresponding to the document to be edited is synchronized in step S147 with the document addition on the browser-type edit screen 128, thus adding the managed document 125. When a new Web page to be edited is created, a new parent document needs to be added, while when a new child document to be embedded in the parent document is created, the new child document needs to be added. A new managed document 125 is added each time a document is added to the browser-type edit screen 128. This allows for the addition of a new document to be edited through the edit operation on the browser-type edit screen 128.

Further, when such an edit operation as to delete a document to be edited is performed on the browser-type edit screen 128, the synchronization means 107 synchronizes the deletion of a managed document 125 corresponding to the document to be edited with the deletion of the document to be edited on the browser-type edit screen 128, thus deleting the managed document 125. Similarly, in step S147, when such an edit operation as to delete a document to be edited is performed on the browser-type edit screen 128, the deletion of a managed document 125 corresponding to the document to be edited is synchronized with the deletion of the document to be edited on the browser-type edit screen 128, thus deleting the managed document 125. This allows for the deletion of a document to be edited through the edit operation on the browser-type edit screen 128.

Note that such an edit operation as to cancel the embedding of a document to be edited as a child document may also be performed on the browser-type edit screen 128. Under such circumstances, it should be considered two different cases: (a) when there are two or more embedding positions for the child document, and (b) when there is only one embedding position for the child document. In case (a), the Web page authoring apparatus 100 and the Web page authoring method 140 typically synchronizes the cancellation of embedding of a relevant managed document 125 with the cancellation of embedding of the document to be edited on the browser-type edit screen 128 to delete only the link information 364b or 364c (FIG. 8). In case (b), the synchronization means 107 synchronizes the deletion of the relevant managed document 125 with the cancellation of embedding of the document to be edited on the browser-type edit screen 128 to delete the managed document 125.

The document structure information 126 is tree structure information, while the Web page structure information 127 is tree structure information connecting all pieces of tree structure information on the managed documents 125 in such a management relationship that a node associated with embed-related code in tree structure information on a certain managed document 125 is attached to the root of another managed document 125 to be embedded in the certain managed document 125 according to the embed-related code. The DOM information 361a, 361b, 361c is an example of the document structure information 126 as the tree structure information, while the view object tree 370 is an example of the Web page structure information 127 as the tree structure information.

FIG. 9 shows an example of a CSS (Cascading Style Sheet) specification in a Web page document. This CSS specification is an example of an external file describing the style of view objects in a browser. FIG. 9A shows an example of a direct description of CSS as an external file. In this example, <LINK href="mystyle.css" rel="stylesheet"> is described in the <HEAD> section of a JSP document 401, so that a file having a file name "mystyle.css," is specified as CSS. FIG. 9B shows an example of an indirect description of CSS as an external file. In this case, the statement of a fragment file 405 is interpreted based on <%@ include file="fragment2.jsp" %> in the <HEAD> of a JSP document 404, and a file having a file name "mystyle.css" is specified as CSS by the description <LINK href="mystyle.css" rel="stylesheet"> in the fragment file 405.

Figure 10:
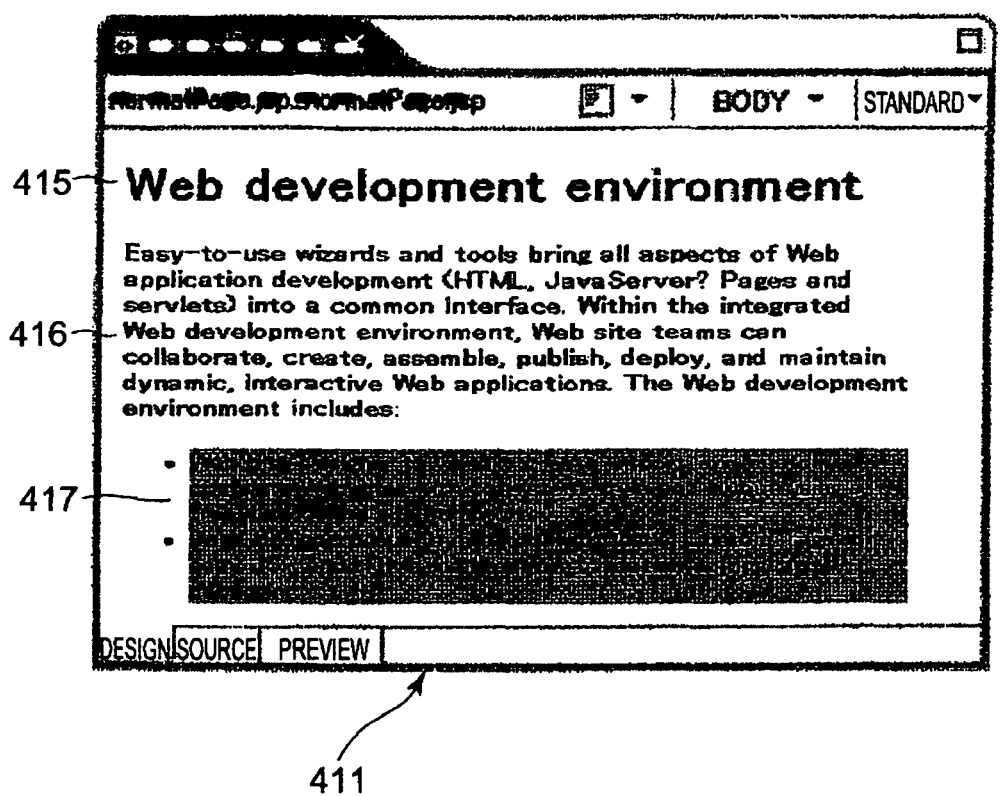
FIG. 10 shows a display example of a browser-type edit screen of the Web page authoring tool.

FIG. 10 shows a display example of a browser-type edit screen 411 of a Web page authoring tool 410. The Web page authoring tool 410 is another example of the Web page authoring apparatus 100, and the browser-type edit screen 411 is another example of the browser-type edit screen 128. In this case, different paragraph styles are applied, that is, a heading style is applied to paragraph 415, a normal style to paragraph 416, and a bullet list style to paragraph 417. The Web page to be edited displayed on the browser-type edit screen 411 uses CSS as an external file to specify color for each paragraph. In the CSS, the text color of the paragraph 415 is set to blue, the text color of the paragraph 416 to green, and the background color of the paragraph 417 to red. Although the black-and-white display in FIG. 10 makes it hard to distinguish differences in color, the actual browser-type edit screen 411 displays each paragraph with a set color.

The managed documents 125 in the Web page authoring apparatus 100 and the Web page authoring method 140 may include a CSS specification or style tags. In such a case, these styles are applied to not only view objects related to the parent document on the browser-type edit screen 128, but also view objects related to the child documents.

Figure 11:
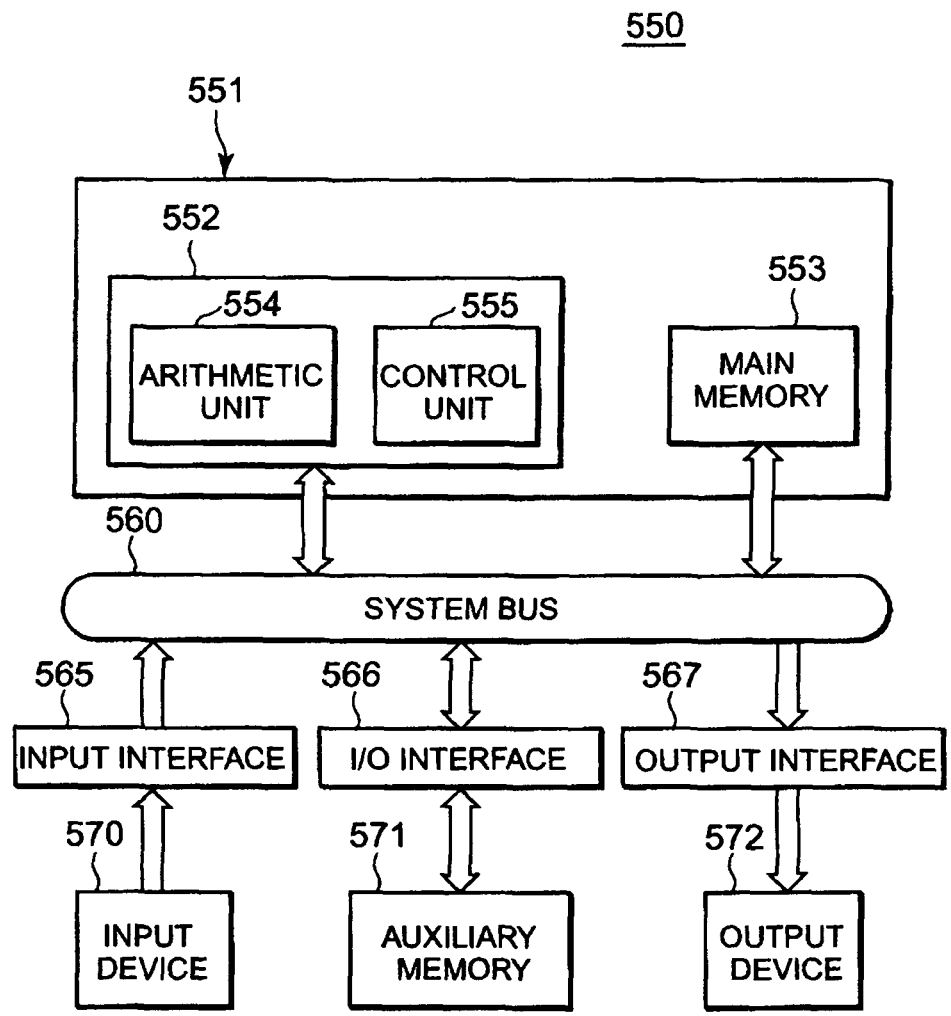
FIG. 11 is a schematic block diagram of a computer on which a program of the present invention is implemented.
Figure 12:
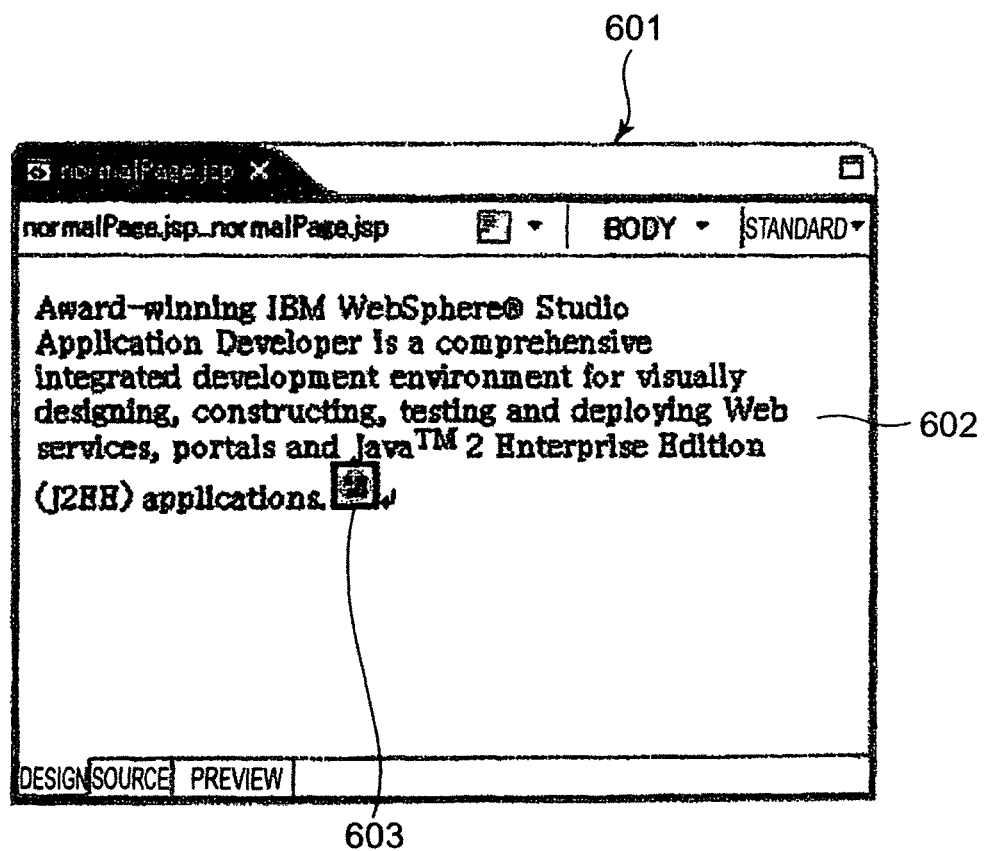
FIG. 12 shows a display state of a parent document on a browser-like edit screen of a conventional Web page authoring tool.
Figure 13:
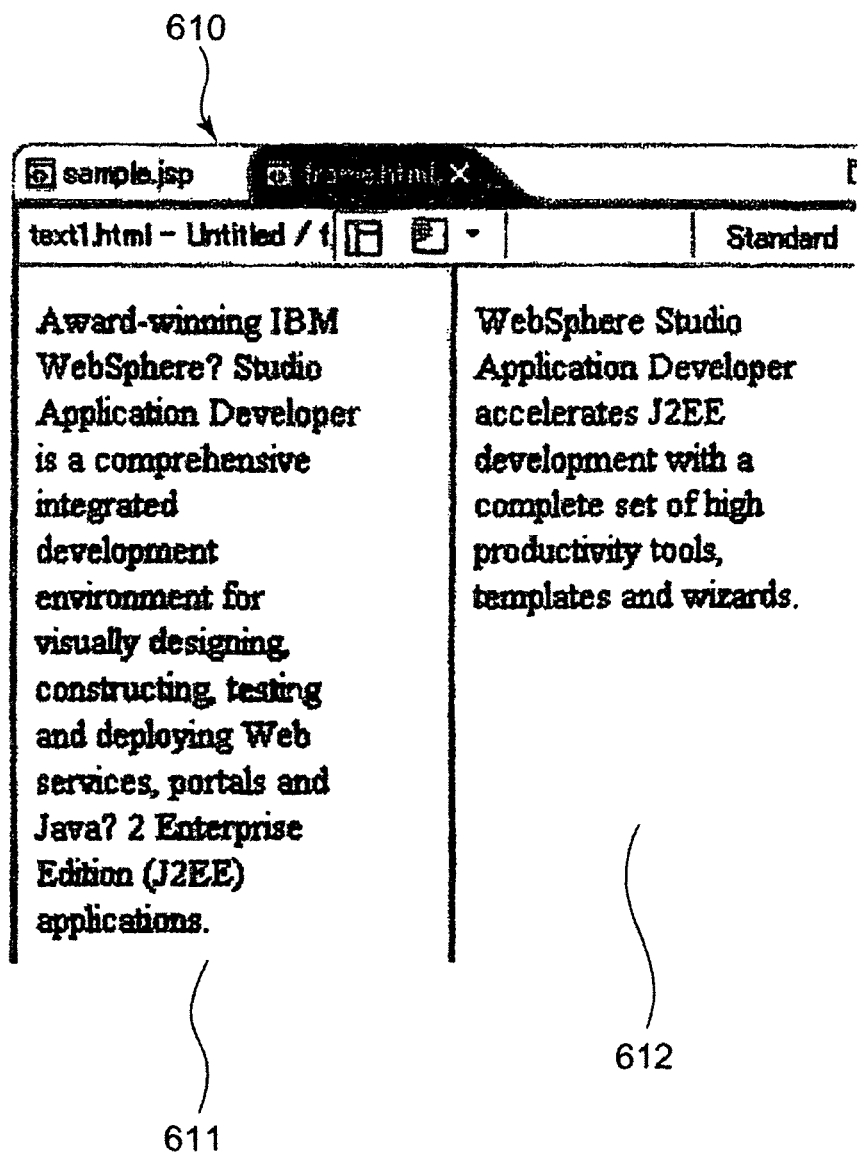
FIG. 13 shows a browser-type frame editing screen of the conventional Web page authoring tool.
Figure 14:
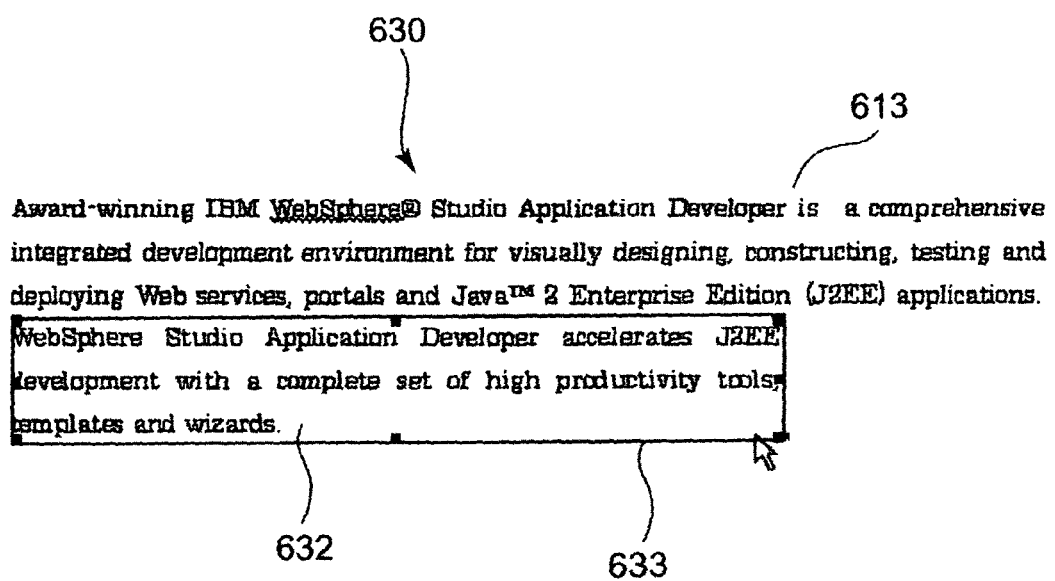
FIG. 14 shows an edit screen of Microsoft® Word.

FIG. 11 is a schematic block diagram of a computer 550 on which a program of the present invention is implemented. A Web page authoring program of the present invention causes the computer 550 to function as the respective means of the Web page authoring apparatus 100. Alternatively, a Web page authoring program of the present invention causes the computer 550 to execute respective processing steps of the Web page authoring method 140.

The present invention can be implemented in hardware, software, or a combination thereof. As a typical example of a combination of hardware and software, the present invention is implemented in a computer system with a predetermined program. In this case, the predetermined program is loaded and executed in the computer system to control the computer system to execute the processing operations according to the present invention. This program consists of a set of instructions that can be represented in any language, code, and notation. The set of instructions allows the computer system to execute specific functions directly or after either or both of (a) transformation into another language, code, or notation, and (b) duplication onto another medium. In addition to the program itself, a medium recording the program and a program product are also included within the scope of the present invention. The program executing the functions of the present invention can be stored on any computer-readable medium, such as a flexible disk, MO, CD-ROM, DVD, hard disk, ROM, MRAM, or RAM. The program of the present invention can also be stored on a recording medium by downloading it from another computer system connected through a communication line, or duplicating it from another recording medium. Further, the program of the present invention can be stored on one or more recording media by compressing or dividing it into two or more program components.

As shown in FIG. 11, a computer main body 551 includes a CPU 552 and a main memory 553. The CPU 552 includes an arithmetic unit 554 and a control unit 555. The arithmetic unit 554 performs calculations, comparison, determination, etc., while the control unit 555 controls the main memory 553, the arithmetic unit 554, etc. A system bus 560 consists of a data bus, an address bus, and a control bus to connect the CPU 552, the main memory 553, an input interface 565, an I/O interface 566, and an output interface 567. An input device 570 includes, for example, a keyboard, a read-only CD drive, etc. to send data to the system bus 560 through the input interface 565. An auxiliary memory 571 is, for example, an HDD (hard disk drive) or a CD-R/W drive to exchange data with the system bus 560 through the I/O interface 566. An output device 572 includes, for example, a display and a printer to receive data from the system bus 560 through the output interface 567. The program of the present invention is stored, for example, in the auxiliary memory 571 such as an HDD, and read into the main memory 553 to execute the functions.

The invention claimed is:

1. A Web page authoring apparatus, the apparatus comprising a processor operatively coupled to a computer memory, the computer memory having disposed within it computer program instructions for:
    individually managing the content of documents forming the respective portions of a Web page to be edited, as managed documents;
    deriving, from the content of each managed document, structure information of each managed document including an embed-related code for embedding another document at a predetermined embedding position, as document-by-document structure information;
    assembling, as Web page structure information, structure information of the Web page to be edited by combining the document-by-document structure information based on the embed-related code in each document-by-document structure information;
    generating edit screen data to create an edit screen on which the tag content of a document to be edited are converted to visual representation, based on the content of the managed documents and the Web page structure information;
    generating an edit screen based on the edit screen data, wherein tag content of the document to be edited is displayed on the edit screen without tags and wherein edit operations may be performed on the edit screen;
    detecting, as a relevant managed document, a managed document including a portion corresponding to an edited portion on the edit screen; and
    synchronizing the content of the relevant managed document with the edited content on the edit screen based on edit operations on the edit screen, including editing the relevant managed document in dependence upon edits made in the edit screen,
    wherein computer program instructions for generating an edit screen based on the edit screen data matches the edit screen data with the edited content on the edit screen based on the edit operations on the edit screen.

2. The apparatus according to claim 1, wherein computer program instructions for generating an edit screen based on the edit screen data updates the edit screen data based on the synchronization between the content of the managed documents and the Web page structure information in order to match the edit screen data with the edited content on the edit screen.

3. The apparatus according to claim 1 wherein the computer memory also has disposed within it computer program instructions for:
    saving at least a managed document, which is associated with the Web page to be edited and the content of which is updated, to save the Web page to be edited in an auxiliary memory, and
    loading all the documents associated with the Web page to be edited to load the Web page to be edited from the auxiliary memory prior to start of editing,
    wherein the computer program instructions for individually managing the content of documents forming the respective portions of a Web page to be edited, as managed documents manages the content of the loaded, associated documents individually as managed documents.

4. The apparatus according to claim 3, wherein the computer program instructions for loading all the documents associated with the Web page to be edited to load the Web page to be edited from the auxiliary memory prior to start of editing includes
    computer program instructions for loading a top-level document among the managed documents associated with the Web page to be edited, and
    computer program instructions for, when a managed document lower than the loaded managed document by one level is to embedded in the loaded managed document, loading the lower managed document from the auxiliary memory.

5. The apparatus according to claim 1, wherein when such an edit operation as to add a new document to be edited is performed on the edit screen, the computer program instructions for synchronizing the content of the relevant managed document with the edited content on the edit screen synchronizes the addition of a managed document corresponding to the document to be edited with the document addition on the edit screen in order to add the managed document.

6. The apparatus according to claim 1, wherein when such an edit operation as to delete a document to be edited is performed on the edit screen, the computer program instructions for synchronizing the content of the relevant managed document with the edited content on the edit screen synchronizes the deletion of a managed document corresponding to the document to be edited with the deletion of the document to be edited on the edit screen in order to delete the managed document.

7. The apparatus according to claim 1, wherein the Web page is a structured document, and each associated document of the Web page is a structured document or a document for generating a structured document.

8. The apparatus according to claim 7, wherein the document-by-document structure information is tree structure information, and the Web page structure information is tree structure information connecting all pieces of tree structure information of the managed documents according to a managed document relationship in which a node for embed-related code in tree structure information of a certain managed document is connected to the root of another managed document to be embedded in the certain managed document according to the node for embed-related code.

9. The apparatus according to claim 1, wherein the edit screen is a browser-type edit screen.

10. A Web page authoring method comprising:
a document-by-document management step of individually managing the content of documents forming the respective portions of a Web page to be edited, as managed documents;
a document-by-document structure information deriving step of deriving, from the content of each managed document, structure information of each managed document including an embed-related code for embedding another document at a predetermined embedding position, as document-by-document structure information;
a Web page structure information assembling step of assembling, as Web page structure information, structure information of the Web page to be edited by combining the document-by-document structure information based on the embed-related code in each document-by-document structure information;
an edit screen data generating step of generating edit screen data to create an edit screen on which the tag content of a document to be edited are converted to visual representation, based on the content of the managed documents and the Web page structure information;
an edit screen generating step of generating an edit screen based on the edit screen data, wherein tag content of the document to be edited is displayed on the edit screen without tags and wherein edit operations may be performed on the edit screen;
a relevant managed document detecting step of detecting, as a relevant managed document, a managed document including a portion corresponding to an edited portion on the edit screen; and
a synchronization step of synchronizing the content of the relevant managed document with the edited content on the edit screen based on edit operations on the edit screen, including editing the relevant managed document in dependence upon edits made in the edit screen,
wherein the edit screen data generating step matches the edit screen data with the edited content on the edit screen based on the edit operations on the edit screen.

11. The method according to claim 10, wherein the edit screen data generating step updates the edit screen data based on the synchronization between the content of the managed documents and the Web page structure information in order to match the edit screen data with the edited content on the edit screen.

12. The method according to claim 10 further comprising a saving step of saving at least a managed document, which is associated with the Web page to be edited and the content of which is updated, to save the Web page to be edited in an auxiliary memory, and a loading step of loading all the documents associated with the Web page to be edited to load the Web page to be edited from the auxiliary memory prior to start of editing,
wherein the document-by-document management step manages the content of the loaded, associated documents individually as managed documents.

13. The method according to claim 12 wherein the loading step includes
a step of loading a top-level document among the managed documents associated with the Web page to be edited, and
a step of, when a managed document lower than the loaded managed document by one level is to embedded in the loaded managed document, loading the lower managed document from the auxiliary memory.

14. The method according to claim 10, wherein when such an edit operation as to add a new document to be edited is performed on the edit screen, the synchronization step synchronizes the addition of a managed document corresponding to the document to be edited with the document addition on the edit screen in order to add the managed document.

15. The method according to claim 10, wherein when such an edit operation as to delete a document to be edited is performed on the edit screen, the synchronization step synchronizes the deletion of a managed document corresponding to the document to be edited with the deletion of the document to be edited on the edit screen in order to delete the managed document.

16. The method according to claim 10, wherein the Web page is a structured document, and each associated document of the Web page is a structured document or a document for generating a structured document.

17. The method according to claim 16, wherein the document structure information is tree structure information, and the Web page structure information is tree structure information connecting all pieces of tree structure information of the managed documents according to a managed document relationship in which a node for embed-related code in tree structure information of a certain managed document is connected to the root of another managed document to be embedded in the certain managed document according to the node for embed-related code.

18. The method according to claim 10, wherein the edit screen is a browser-type edit screen.

19. A program product comprising a non transitory computer-readable recording medium and a program recorded on the recording medium to cause a computer to execute each step of a Web page authoring method, the Web page authoring method comprising:
a document-by-document management step of individually managing the content of documents forming the respective portions of a Web page to be edited, as managed documents;
a document-by-document structure information deriving step of deriving, from the content of each managed document, structure information of each managed document including an embed-related code for embedding another document at a predetermined embedding position, as document-by-document structure information;
a Web page structure information assembling step of assembling, as Web page structure information, structure information of the Web page to be edited by combining the document-by-document structure information based on the embed-related code in each document-by-document structure information;

an edit screen data generating step of generating edit screen data to create an edit screen on which the tag content of a document to be edited are converted to visual representation, based on the content of the managed documents and the Web page structure information;

an edit screen generating step of generating an edit screen based on the edit screen data, wherein tag content of the document to be edited is displayed on the edit screen without tags and wherein edit operations may be performed on the edit screen;

a relevant managed document detecting step of detecting, as a relevant managed document, a managed document including a portion corresponding to an edited portion on the edit screen; and a synchronization step of synchronizing the content of the relevant managed document with the edited content on the edit screen based on edit operations on the edit screen, including editing the relevant managed document in dependence upon edits made in the edit screen, wherein the edit screen data generating step matches the edit screen data with the edited content on the edit screen based on the edit operations on the edit screen.

\* \* \* \* \*